US012548891B2

(12) United States Patent
Williams

(10) Patent No.: US 12,548,891 B2
(45) Date of Patent: Feb. 10, 2026

(54) HIGH FREQUENCY (HF) RADIO COMMUNICATION ANTENNA SYSTEM WITH AIRBORNE ANTENNA POSITIONING UNIT

(71) Applicant: Kennside, LLC, Carrollton, TX (US)

(72) Inventor: Ryan P. Williams, Carrollton, TX (US)

(73) Assignee: Kennside, LLC, Carrollton, TX (US)

( * ) Notice: Subject to any disclaimer, the term of this patent is extended or adjusted under 35 U.S.C. 154(b) by 167 days.

(21) Appl. No.: 18/139,687

(22) Filed: Apr. 26, 2023

(65) Prior Publication Data

US 2024/0363997 A1 Oct. 31, 2024

(51) Int. Cl.
*H01Q 1/28* (2006.01)
*H01Q 1/24* (2006.01)
*H01Q 1/34* (2006.01)

(52) U.S. Cl.
CPC ............. *H01Q 1/285* (2013.01); *H01Q 1/241* (2013.01); *H01Q 1/34* (2013.01)

(58) Field of Classification Search
CPC ................................ H01Q 1/285; H01Q 1/30
See application file for complete search history.

(56) References Cited

U.S. PATENT DOCUMENTS 9,407,000 B1 * 8/2016 Willistein ................ H01Q 1/30
11,600,910 B1 * 3/2023 Johnson ................... H01Q 1/48
2014/0008490 A1 * 1/2014 Beard ...................... B64D 3/00 244/110 F
2017/0037590 A1 * 2/2017 Kaufman .............. E02D 35/005
2017/0329351 A1 11/2017 Park et al.
2018/0083364 A1 * 3/2018 Foo .................... H01Q 15/0026
2018/0217267 A1 8/2018 Lim et al.
2018/0287833 A1 10/2018 Kennedy
2019/0020422 A1 1/2019 Wennerlof et al.
2019/0379107 A1 12/2019 Humfeld et al.
2020/0122830 A1 4/2020 Anderson et al.
2020/0295455 A1 9/2020 Mack et al.
2020/0349852 A1 * 11/2020 DiCosola ................. G08G 5/55
2021/0129982 A1 5/2021 Collins et al.
2021/0287559 A1 9/2021 Jeong et al.

OTHER PUBLICATIONS

International Search Report of the International Searching Authority for application No. PCT/US2024/025334, mailed Dec. 5, 2024 (2 pages).

* cited by examiner

*Primary Examiner* — Dieu Hien T Duong
*Assistant Examiner* — Austin M Back
(74) *Attorney, Agent, or Firm* — WARNER NORCROSS + JUDD LLP

(57) ABSTRACT

An HF antenna system is provided. The HF antenna system includes an airborne antenna positioning unit and computes an optimal antenna orientation and length based on relevant wave propagation data to position the antenna for maximal transmission and reception. In one embodiment, the HF antenna system includes an antenna base and control unit (ABCU) and an antenna positioning unit (APU). The ABCU is connected to the APU by an antenna wire. The antenna wire is retractable within the ABCU and is adjustable via positioning of the APU. The APU is an airborne device, such that the APU is tethered to the ABCU but can hoist the terminal end of the antenna wire with complete positional freedom relative to the ABCU.

19 Claims, 11 Drawing Sheets

HIGH FREQUENCY (HF) RADIO COMMUNICATION ANTENNA SYSTEM WITH AIRBORNE ANTENNA POSITIONING UNIT

BACKGROUND OF THE INVENTION

High frequency (HF) radio communications encompass radio transmissions that range from 3 to 30 MHz. Sometimes referred to as "shortwave" communications, HF radio transmissions include shorter wavelengths than those used for long-range radio transmissions. The range of HF radio transmissions can be extended over significant distances however by bouncing off of the ionosphere—a method known as skip propagation. Other attributes of HF radio transmissions include a smaller electromagnetic (EM) footprint and the ability to operate in areas where satellite or cellular networks are not available or reliable.

HF radios are used in a variety of applications including military communications, aviation communications, maritime communications, and emergency communications. However, HF radios can be difficult to employ in a field setting, on the move, or in close proximity to other equipment or structures due to the size and positioning requirement of an effective antenna. Utilization of existing manufactured or field expedient HF antennas can be cumbersome, sub-optimally positioned or matched to the desired frequency, and highly challenging to operate while moving. For these reasons, radio operators often forgo the advantages of HF radios in favor of speed, mobility, and more reliable communication offered by other systems.

SUMMARY OF THE INVENTION

The present invention overcomes the shortcomings of existing HF radios in field settings, in transit, and/or in close proximity to other equipment and/or structures by delivering a dynamic and automated HF antenna system. As discussed herein, the HF antenna system includes an airborne antenna positioning unit and computes an optimal antenna orientation based on relevant wave propagation data to position the antenna for maximal transmission and reception.

In one embodiment, the HF antenna system includes an antenna base and control unit (ABCU) and an antenna positioning unit (APU). The ABCU is connected to the APU by an antenna wire. The antenna wire is retractable within the ABCU and is adjustable via positioning of the APU. The APU is an airborne device, such that the APU is tethered to the ABCU but can hoist the terminal end of the antenna wire with complete positional freedom relative to the ABCU.

In another embodiment, a method for positioning an antenna wire of the HF antenna system is provided. The method includes calculating an antenna length and an antenna orientation based on time-of-day data, a radio station's positional data, and/or environmental data. The method includes positioning the APU such that the antenna wire is at the calculated antenna length and orientation. In this position, the antenna wire is optimally positioned for receiving and/or transmitting data via a radio connection established between the system and a remote radio station.

These and other features and advantages of the present invention will become apparent from the following description of the invention, when viewed in accordance with the accompanying drawings and appended claims.

Before embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

As discussed herein, the current embodiments includes an HF antenna system. The HF antenna system includes an antenna base and control unit (ABCU) and an antenna positioning unit (APU). The ABCU is connected to the APU by a flexible antenna wire, and the antenna is retractable within the ABCU and is orientated via positioning of the APU. The APU is an airborne device, such that the APU is tethered to the ABCU but can hoist the terminal end of the antenna wire with complete positional freedom. Although well suited for HF communications, the system is not limited to this frequency range and can function at any suitable EM frequency.

Figure 1:
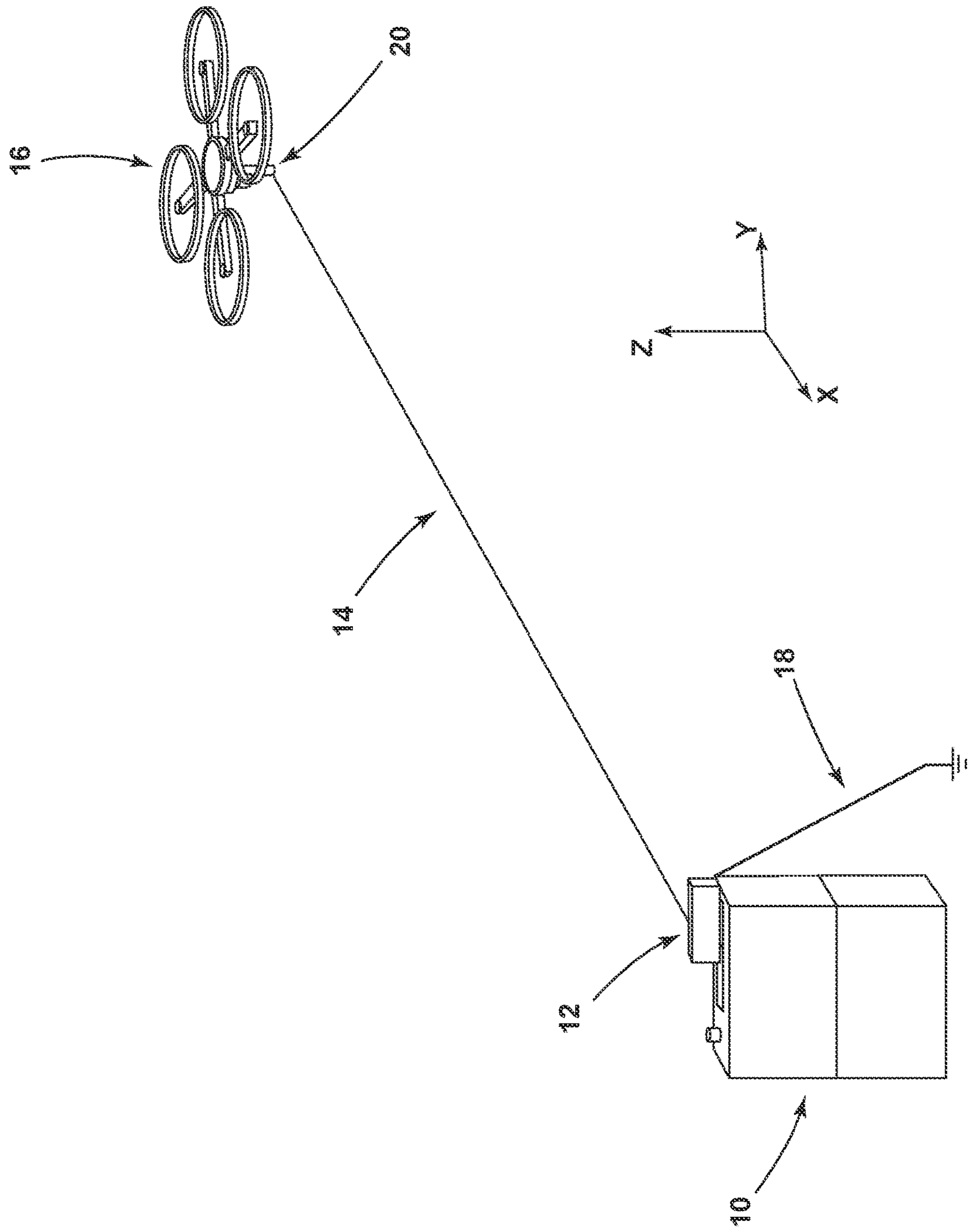
FIG. 1 is a depiction of the high frequency (HF) radio communications antenna system attached to a HF receiver/transmitter.

Referring first to FIG. 1, an HF antenna system according to one embodiment is illustrated. The HF antenna system includes an HF receiver/transceiver 10, an ABCU 12, an antenna wire 14, and an APU 16. The HF antenna system includes an optional grounding wire 18 and an insulated wire connection 20 to connect the antenna wire 14 to the APU 16 and prevent the APU 16 from interfering with the antenna wire 14. Each such feature is separately discussed below.

The HF receiver/transceiver 10 includes a radio receiver, a transmitter, and a user interface that permits the operator to select the frequency and power output for HF radio communications. The HF receiver/transceiver 10 can use a variety of modulation schemes, including amplitude modulation, frequency modulation, and single sideband modulation, to encode the information being transmitted. The HF receiver/transmitter is not particularly limited, and can be any receiver/transmitter capable of receiving and transmitting HF radio signals.

The ABCU 12 is generally adapted to calculate an antenna length and an antenna orientation and is also adapted to command the APU 16 to position the terminal end of the antenna wire 14 accordingly. The antenna wire 14 comprises a wire or a cable that is tuned (or tunable) to a specific frequency or range of frequencies. Optional antenna wires include AWG-18 gauge wire, the wire comprising copper, silver, gold, or steel for example. The antenna wire 14 can include a radio wire that is helically wound about an insulated APU power and control wire. Alternatively, the antenna wire 14 can include an insulated APU power and control wire that is helically wound about a radio wire. Other configurations for the antenna wire are possible in other embodiments.

The APU 16 includes an aerial platform, optionally a multi-rotor drone, further optionally a quadcopter or a hexacopter. Alternative embodiments include a lighter-than-air balloon with positioning propellers or some other mechanism to hold the antenna wire aloft with the appropriate orientation. Still other embodiments include a fixed wing unmanned aerial device. As shown in FIG. 1, the APU 16 is physically coupled to the terminal end of the antenna wire 14 and is configured to orient the terminal end of the antenna wire 14 relative to the ABCU 10 with the desired Cartesian or polar coordinates. The APU 16 may be self-sufficient such that it comprises an internal battery and a radiofrequency (RF) control receiver/transmitter. The APU 16 may also comprise no battery or RF control receiver/transmitter. In some embodiments, the APU 16 will further comprise a power wire, wherein the power wire is connected to an external power source or the ABCU 12 and powers the APU 16. In embodiments where the APU 16 includes a battery, the battery powers the APU rotor(s)/propeller(s), and in embodiments where the APU is connected to an external power source, the external power source powers the APU.

The optional grounding wire 18 is coupled to the ABCU 12 and provides a low-resistance path to ground. The grounding wire 18 helps protect the ABCU 12 from electrical surges and can be formed from a heavy gauge wire, optionally copper. By providing a low-resistance path to ground, the grounding wire 18 dissipates any electrical charges that build-up on the antenna 14 to ensure the radio signals are transmitted and received as efficiently as possible.

Figure 2:
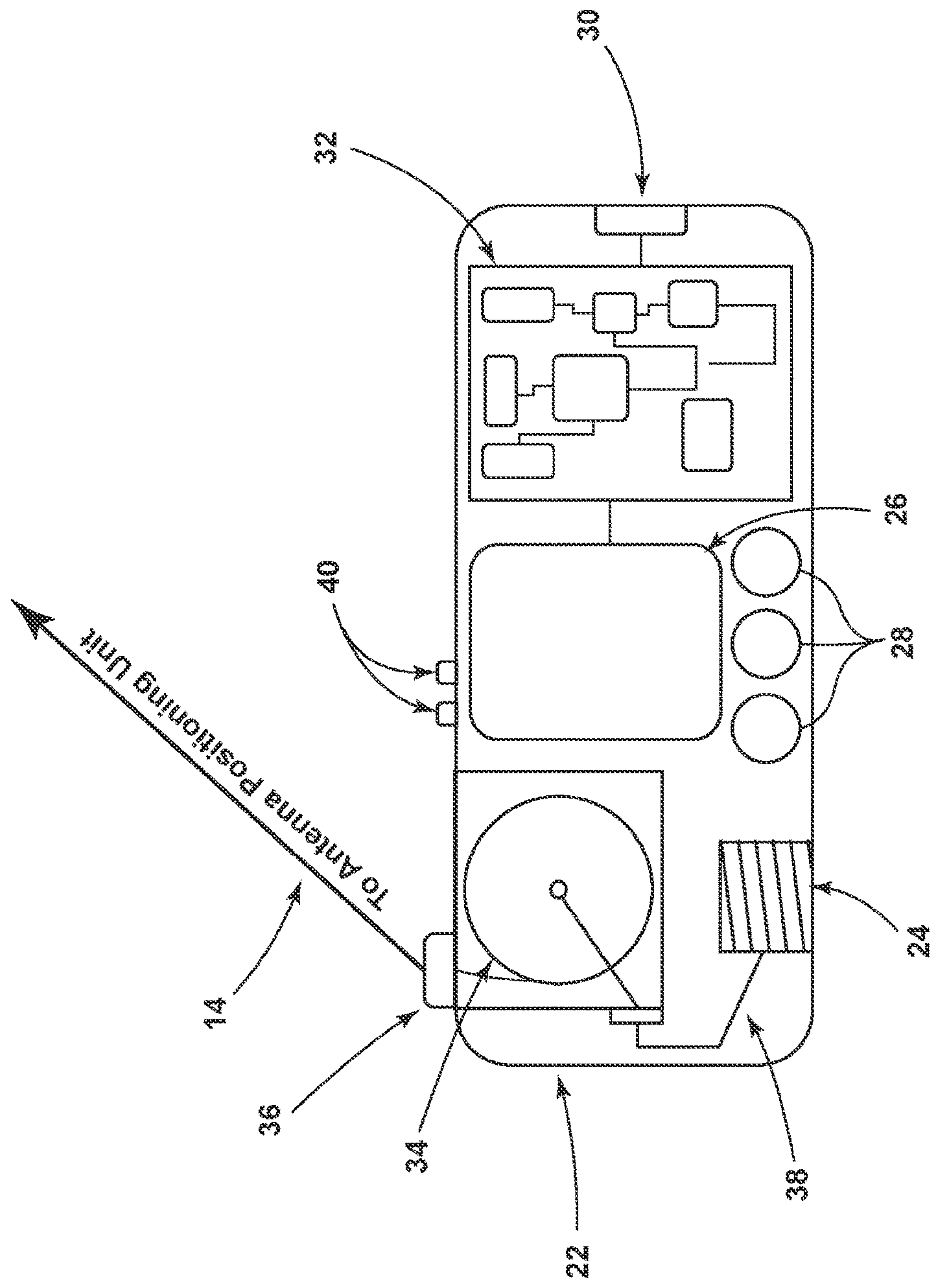
FIG. 2 is a depiction of a detailed cutaway view of the antenna base and control unit and its subcomponents in a specific embodiment.

Referring now to FIG. 2, a schematic diagram of the ABCU 12 is illustrated in accordance with one embodiment. The ABCU 12 includes an exterior shell 22 that is impact resistant, water resistant, and formed from a non-reflective metal, polymer, or other suitable material. The exterior shell 22 can be non-conductive, such that unintentional contact with the antenna wire 18 does not interfere with reception and transmission. The exterior shell 22 can include any number of shapes, including but not limited to a horizontal rectangle with antenna and data port connections that are compatible with current and future radio designs.

The ABCU 12 also includes an antenna radio port 24, an information display 26, and one or more pushbuttons 28. The radio port 24 comprises a threaded female port for connection to a radio antenna of the HF receiver/transceiver 10. The information display 26 provides a LCD screen, touch, screen or other display to show an antenna status. The information display 26 can optionally be used to manually input data for antenna system functions, optionally with the aid of the pushbuttons 28. As also shown in FIG. 2, the ABCU 12 includes a data port 30 and a central processing unit (CPU) 32. The data port 30 can include a micro USB or other physical port for programming, data input, and diagnostics. The CPU 32 includes a controller, a GPS receiver, and computer memory for determining the appropriate position of the APU 16. As discussed in greater detail in connection with FIG. 3, the CPU 32 includes computer readable instructions that, when executed, cause the CPU 32 to determine the appropriate length and orientation of the antenna wire 14. This determination can be based on the location of the ABCU 12, the location of other communication stations, the time of day, the desired radio frequency, and weather data. Though not shown, the ABCU 12 can include an on-board power source, for example a rechargeable battery, if not using power from the HF receiver/transceiver 10.

The ABCU 12 also includes an antenna wire spool 34 and an antenna wire guide 36. The antenna wire spool 34 houses the non-insulated antenna wire 14 and is enclosed in a replaceable cube-shaped cartridge that locks into place in the ABCU 12. The spool 34 is spring-loaded and retracts any fed out wire when the wire is unloaded in tension. The spool 34 is made of an electrically conductive material, and the wound antenna wire 14 remains in contact with itself and the spool 34. This effectively cancels out the unused length of wire on the spool 34, so that the length of the active antenna wire 14 can be precisely matched to the desired frequency (optionally one-half or one-quarter of the wavelength of the desired frequency). The wire guide 36 prevents wire entanglement/kinking, and the wire guide 36 can include a friction lock to halt the wire feed at the desired antenna length. Also shown in FIG. 2, an internal connection 38 couples the antenna wire spool 34 to the radio antenna port 24, and charging contacts 40 on the exterior of the rigid shell 22 providing an electrical connection for powering the ABCU 12.

Figure 3:
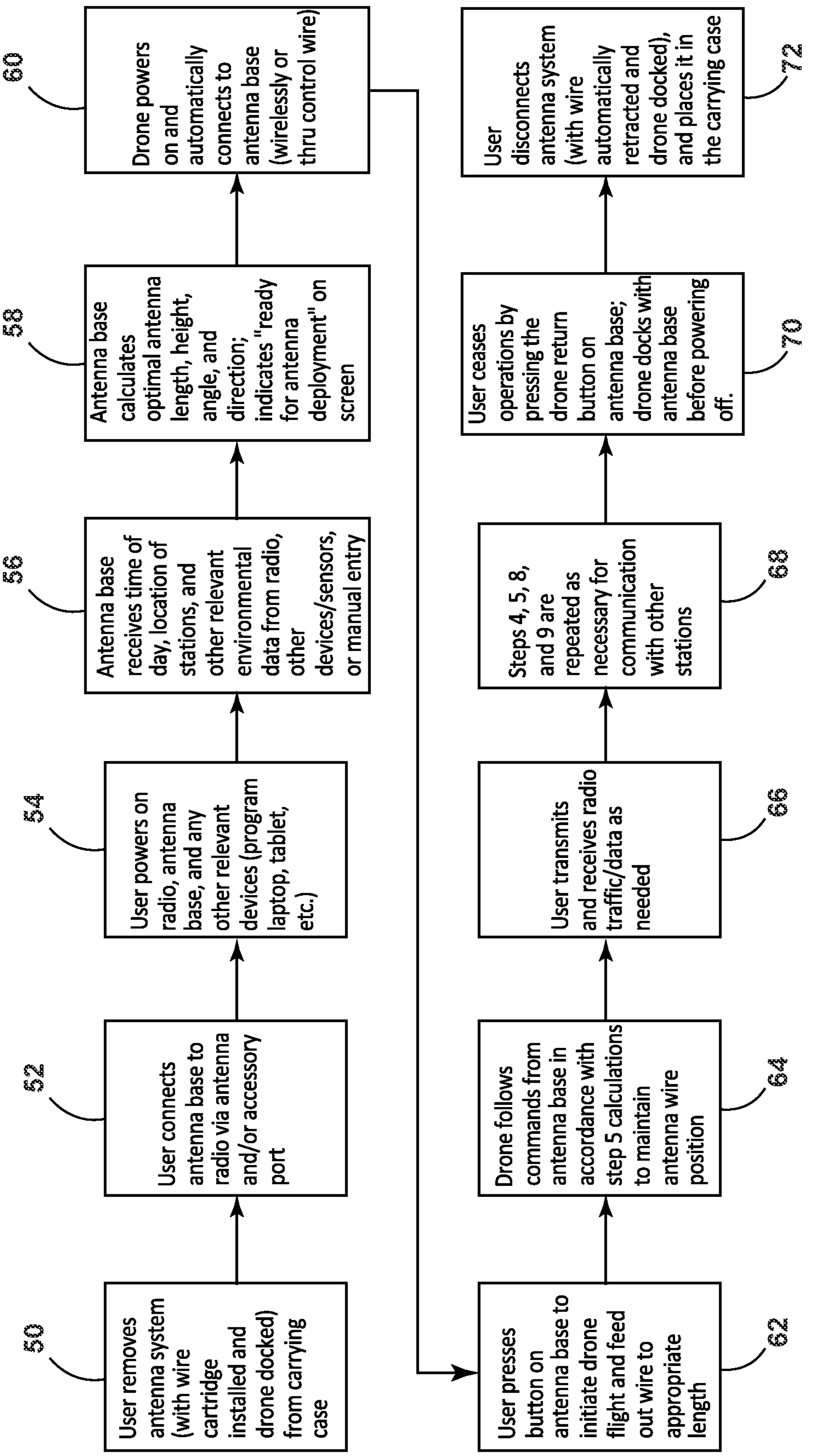
FIG. 3 is a flow chart for positioning an antenna wire of the improved HF radio communications antenna system to transmit or receive data from one or more radio stations.

Referring now to FIG. 3, a method for operating the HF antenna system of FIGS. 1 and 2 is illustrated. At step 50, the operator removes the antenna system from its carrying case, the antenna system including a docked APU 16. At step 52, the operator connects the ABCU 12 to the HF receiver/transceiver 10 via the radio port 24. At step 54, the operator powers on the HF receiver/transceiver 10 and any other relevant devices, including for example a tablet or a laptop computer. At step 56, the ABCU 12 receives time of day, station location, and other relevant environmental data from the HF radio 10, other devices, or via manual entry. At step 58, the ABCU 12 calculates the optimal antenna length, height, angle, and direction and indicates "ready for antenna deployment" on the display screen 26. At step 60, the APU 16 (for example a quadcopter) powers up and automatically connects to the ABCU 12, either wirelessly or via a command wire. At step 62, the operator initiates deployment of the APU 16, and the ABCU 12 feeds out the antenna wire 14 to the appropriate length. At step 64, the APU 16 hoists the terminal end of the antenna wire 14 to the appropriate location (relative to the ABCU 12), such that the antenna wire 14 has the optimal antenna length, height, angle, and direction. At step 66, the foregoing steps 56, 58, and 60 are repeated as necessary for communication with other radio stations. At step 70, the operator ceases operations and commands the APU 16 return to the ABCU 12. At step 72, the operator disconnects the ABCU 12 from the HF radio 10 (with the antenna wire retracted) returns the ABCU 12 to its carrying case for secure storage and transport.

Figure 4:
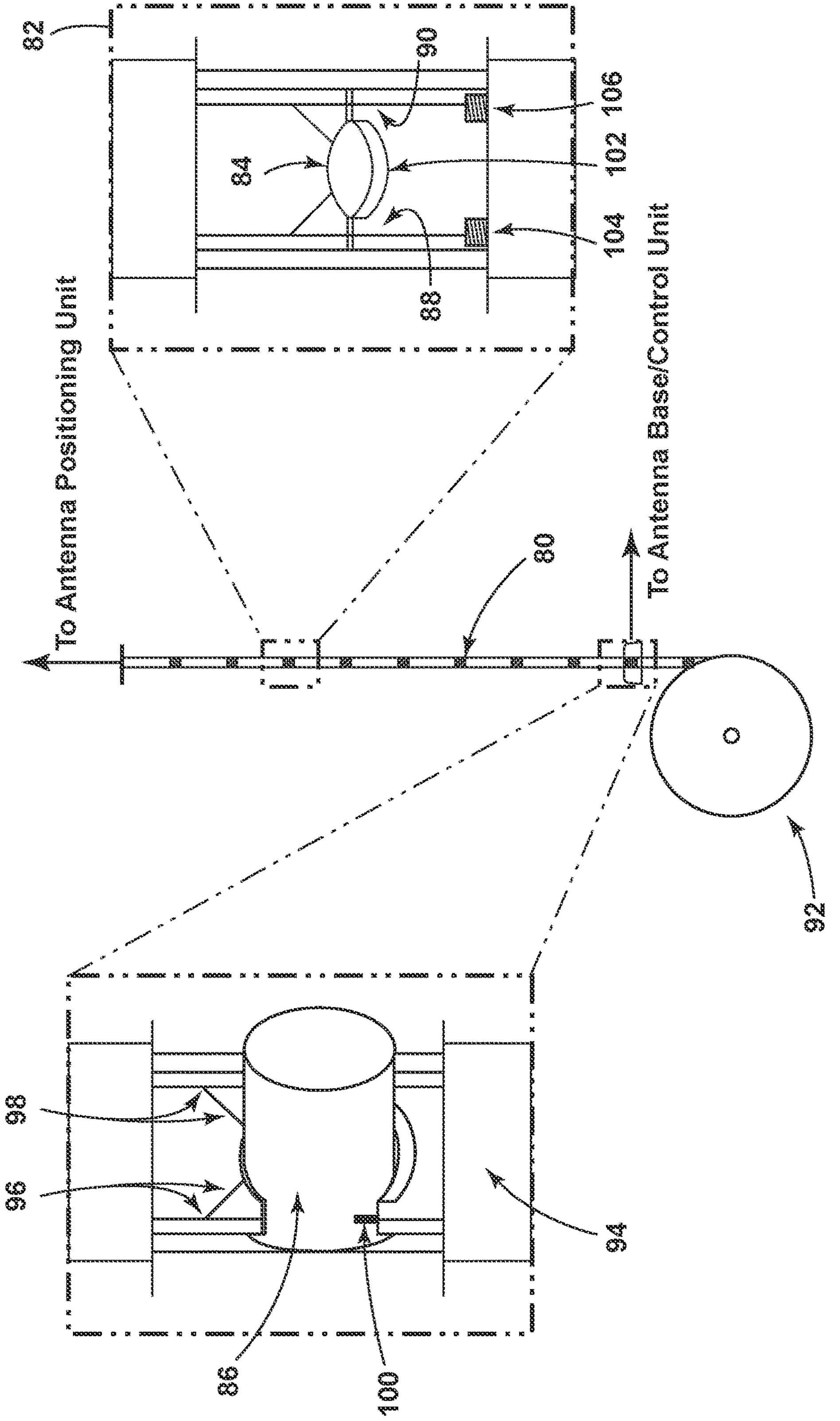
FIG. 4 is a depiction of an insulated antenna wire demonstrating an insulated and length-adjustable antenna wire.

Referring now to FIG. 4, an insulated and adjustable-length antenna wire 80 is illustrated. The antenna wire 80 includes at least one cross-bolt interface connection 82, with each interface connection 82 being positioned in even intervals along the length of the antenna wire 80. The interface connections 82 allow for the fine-tuning of the length of the antenna wire 80 to better match a desired frequency. Each interface connection 82 includes an opening 84 to receive a retractable cross-bolt 86. The cross-bolt 86 connects the active portion of the antenna wire 80 to the HF radio 10. When the cross-bolt 86 is inserted into a cross-bolt opening 84, as shown at left in FIG. 4, the cross-bolt 86 disconnects the lower (spool side) portion of the antenna wire 80 and activates the upper (APU side) portion of the antenna wire 80. The antenna wire 80 is optionally ribbon shaped and includes each of a radio wire 88 and a power and control cable 90.

The base of the antenna wire 80 is coupled to a take-up spool 92, similar to the take-up spool 34 of FIG. 2. Portions of the antenna wire 80 between the interface connections 82 include an insulated exterior sleeve 94, the insulated exterior sleeve 94 being non-conductive, ruggedized, flexible, and weatherproof. The antenna wire 80 includes a weatherproof casing at each connection point to electrically insulate those connections points that are not in use. The upper portion of each interface connection 82 includes an antenna wire connection 96 and a power and control cable connection 98. The lower portion of each interface connection 82 includes a connection prong 100 to maintain continuity along the antenna wire 80. In addition, the lower portion includes an insulated coating 102 to electrically isolate the lower portion of the antenna wire 80 from the cross-bolt 86. First and second springs 104, 106 bias the lower portion of each interface connection 82 towards the upper portion of each interface connection 82 and are electrically coupled to the radio wire 88 and the power and control cable 90, respectively.

Figure 5:
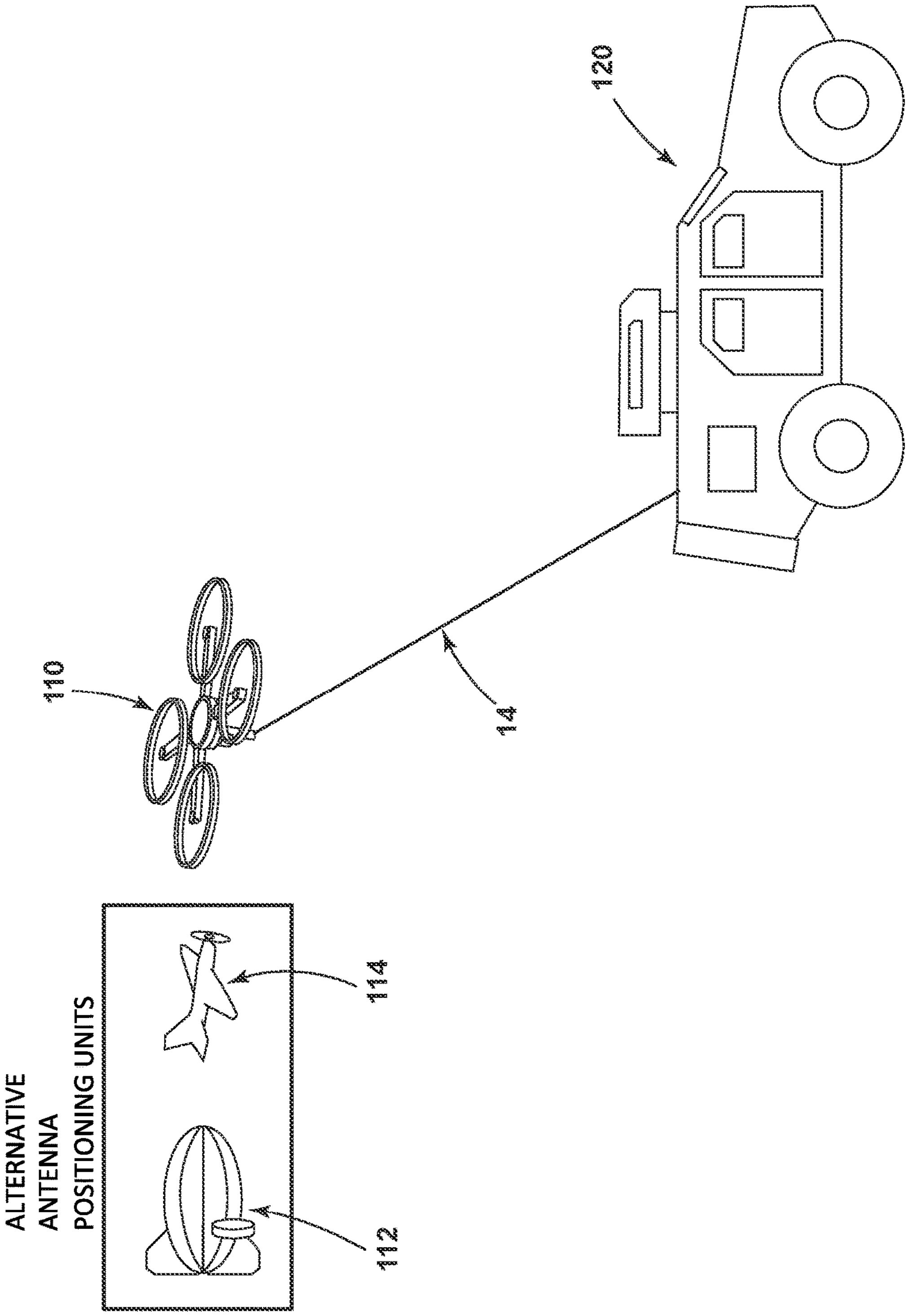
FIG. 5 is a depiction of one embodiment of the invention wherein the HF radio communications antenna system is mounted to a ground vehicle.

Referring now to FIG. 5, the APU 16 is generally selected from a drone 110, a lighter than air device 112, and a fixed wing unmanned aerial device 114. A drone 110, as defined herein, is an autonomous or remote-controlled rotary wing device. A lighter than air device 112 is also autonomous or remote-controlled. In some embodiments, the lighter than air device comprises a positioning propeller. A fixed wing unmanned aerial device 114, as defined herein, is an autonomous or remote-controlled fixed wing device. Generally, the APU 16 will comprise a motor, wherein the motor is used to position the APU 16. In some embodiments, the APU 16 further comprises an insulated antenna wire connection. Where the APU 16 comprises the insulated antenna wire connection, the insulated antenna wire connection connects the antenna wire 14 to the APU 16 and prevents the APU 16 from interfering with the antenna wire 14.

Figure 6:
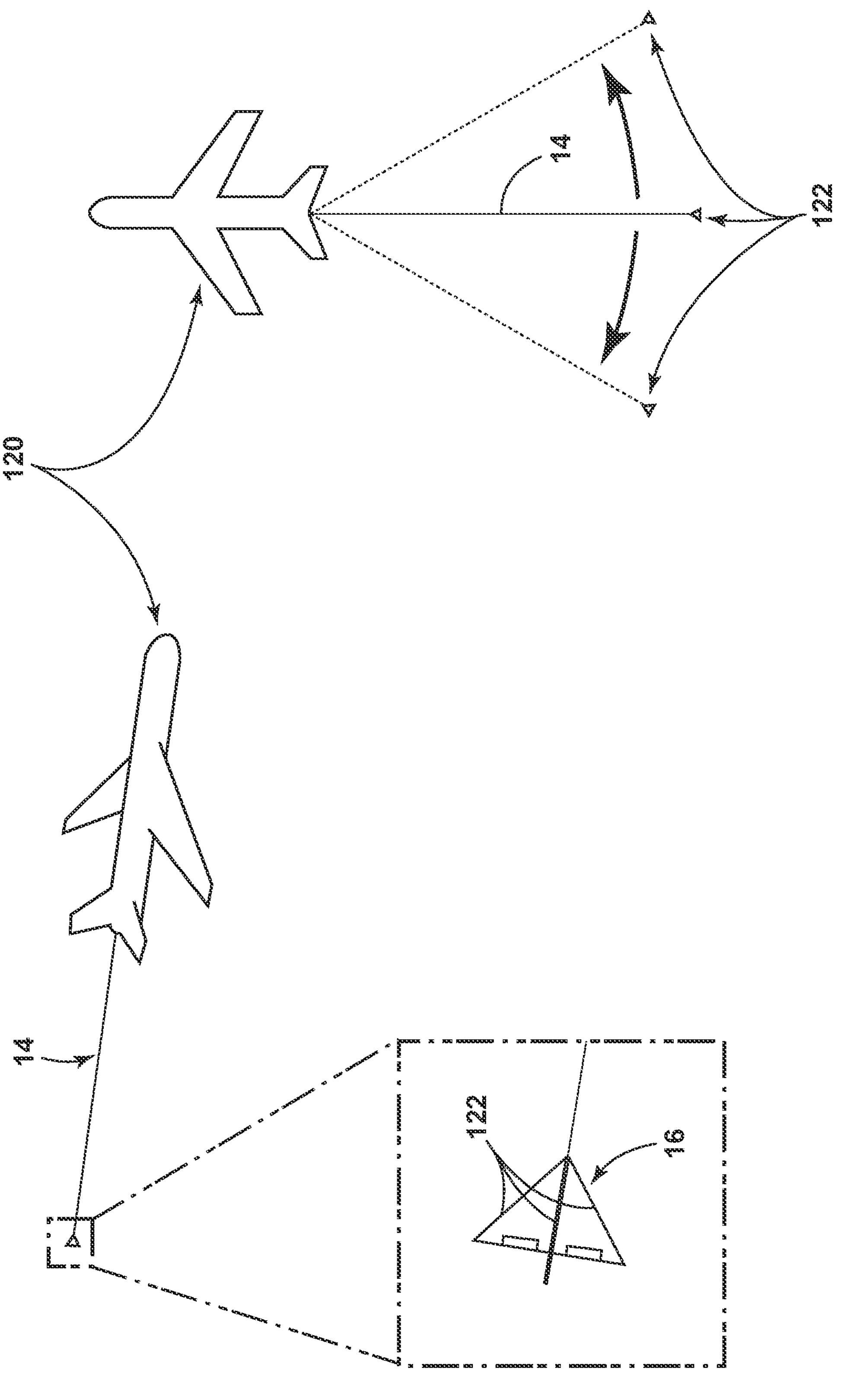
FIG. 6 is a depiction of one embodiment of the invention wherein the HF radio communication antenna system is mounted to an aircraft.
Figure 7:
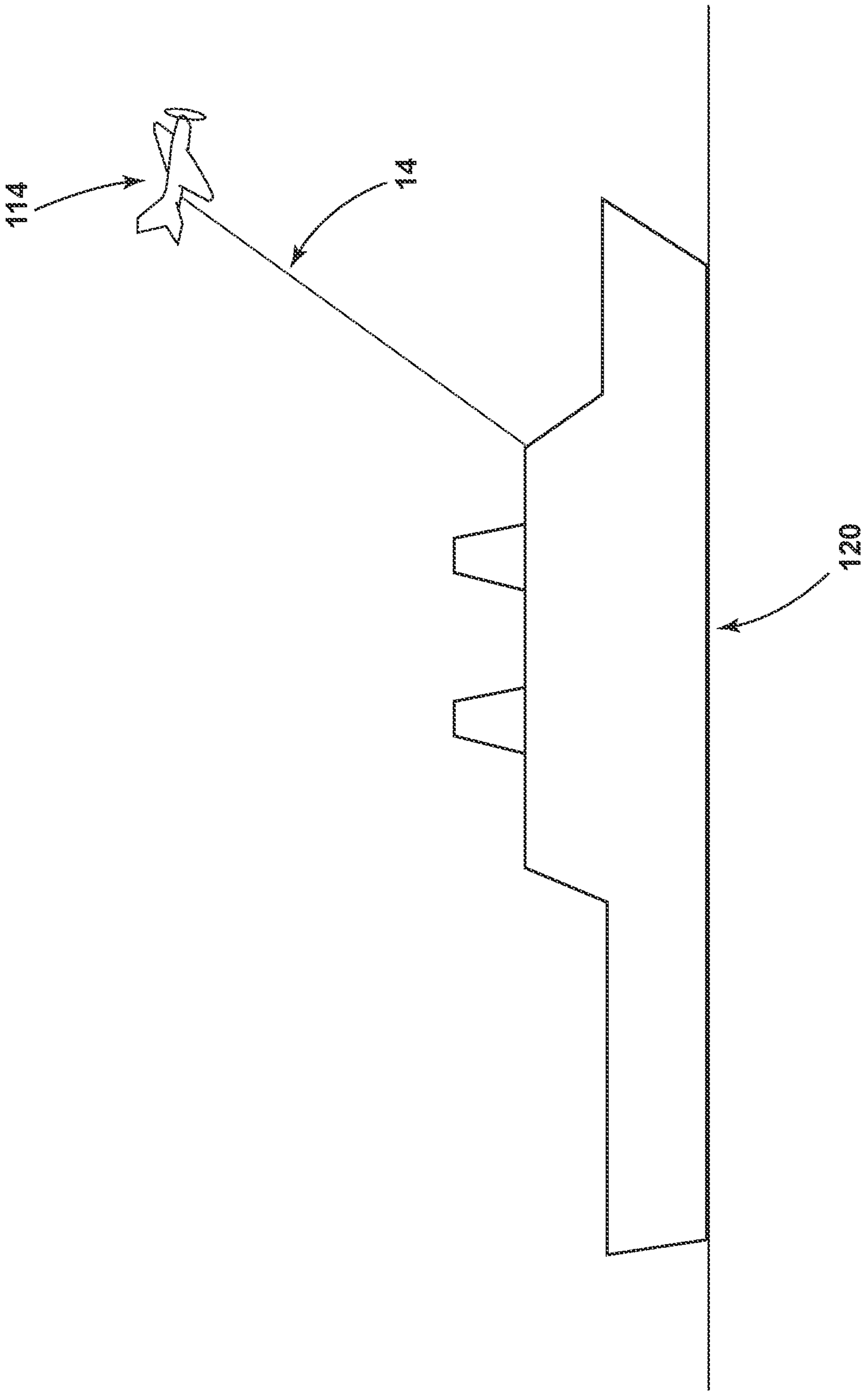
FIG. 7 is a depiction of one embodiment of the invention wherein the HF radio communication antenna system is mounted to a naval vessel.

Generally, the system can be located anywhere. In particular embodiments, the system is located on or inside of a vehicle 120. The vehicle is not particularly limited and can be any vehicle that is sufficiently large enough to contain and support the system. The vehicle 120 is generally selected from land-based vehicles (FIG. 5), aircraft (FIG. 6), and watercraft (FIG. 7). Land-based vehicle includes two-wheeled, three-wheeled, four-wheeled, twelve-wheeled, sixteen-wheeled, tracked vehicles, and any other suitable vehicle that is operational on land. Generally, the land-based vehicle is a motorized vehicle, but the land-based vehicle can alternatively be powered by a human or an animal. The land-based vehicle may be a civilian or military land-based vehicle. Aircraft includes any fixed-wing, rotary-wing, lighter than air, or other suitable airborne vessel. Generally, the aircraft will be manned, but remote operated and autonomous airborne vessels are also envisioned. The aircraft may be a military or civilian airborne vessel. In some embodiments, when the system is located on or inside of a vehicle and the vehicle is an aircraft, the APU 16 is a device towed by the aircraft. When the APU 16 is towed by the aircraft, as shown in FIG. 6, the APU 16 generally comprises positioning fins 122. Watercraft includes any surface, amphibious, submersible, or other suitable water-based vessel, whether military or civilian. An exemplary watercraft is shown in FIG. 7.

Figure 8:
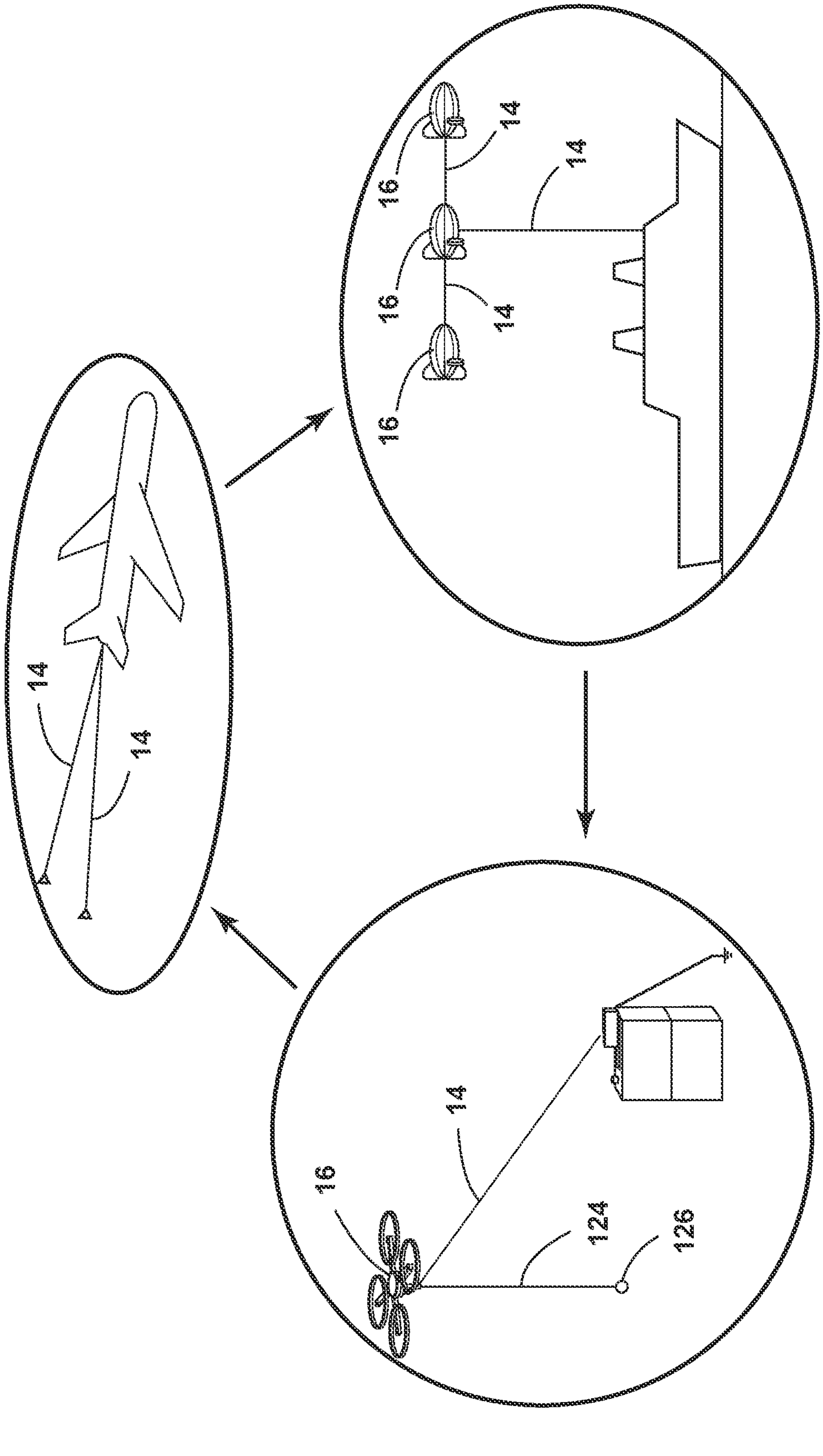
FIG. 8 is a depiction of one embodiment of an integrated HF communications network utilizing synchronized automated antenna systems.
Figure 9:
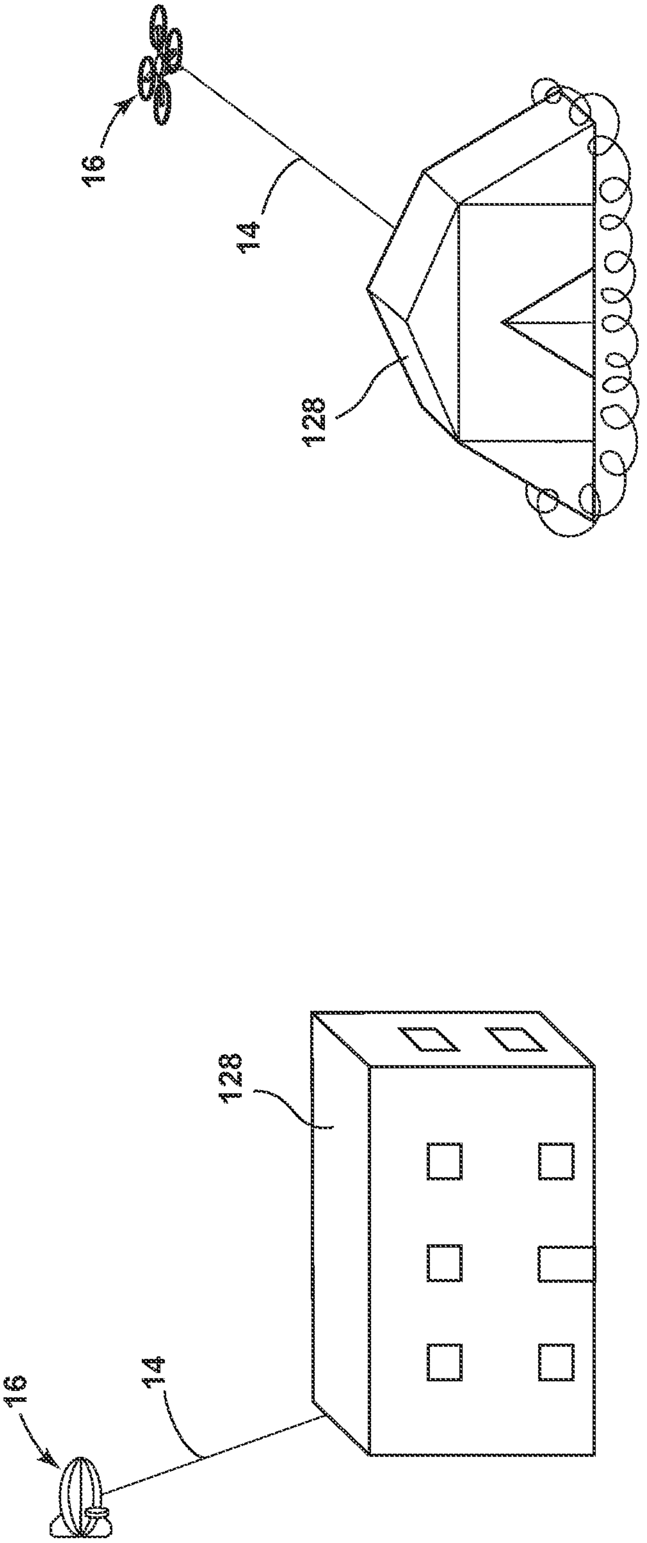
FIG. 9 is a depiction of one embodiment of the invention wherein the HF radio communications antenna system is affixed to a permanent or semi-permanent structure.

As further optionally depicted in FIG. 8, the APU 16 can support an additional monopole antenna 124 with a weighted counterpoise 126. Two or more antenna wires 14 can be deployed in other embodiments, optionally in a V-configuration. Still further optionally, three APUs 16 can be used to support a dipole antenna. As optionally shown in FIGS. 9-10, the system is located on or inside of a structure 128. The structure 128 is not particularly limited and may be any structure large and stable enough to support the system. Structures, as understood herein, are static (i.e., a structure is not a vehicle). In some embodiments, the ABCU is located on or inside of a permanent structure, temporary structure, building, or tent.

Figure 10:
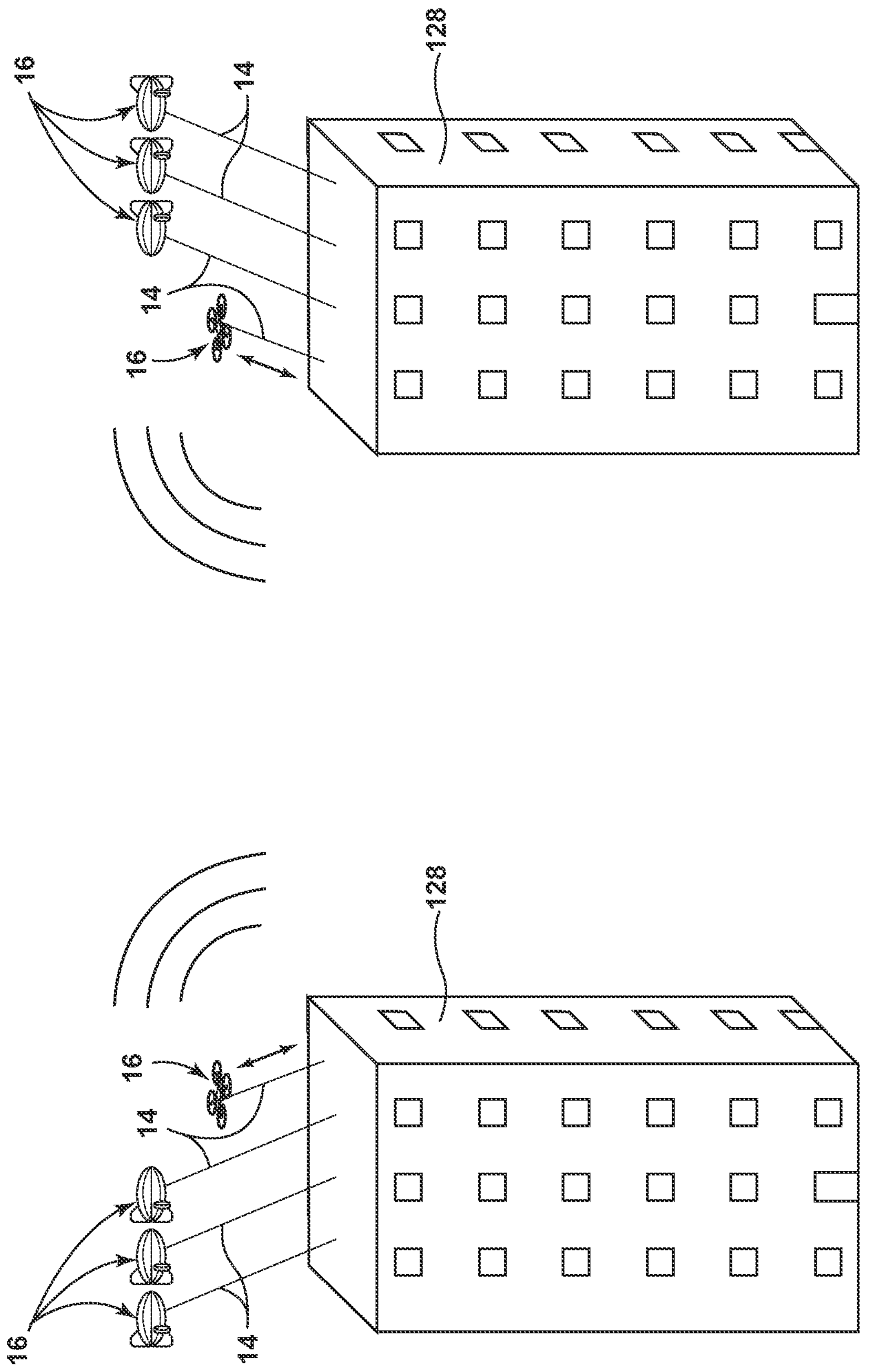
FIG. 10 is a depiction of one embodiment of a multi-system network for fixed locations for static systems intended to send data over long distances.

As also shown in FIG. 10, each structure 128 can support multiple HF antenna systems. In this configuration, at least one HF antenna system can be dynamic to determine an optimal frequency, antenna length, and/or antenna orientation, and thereafter communicate this information to some or all of the HF antenna systems on the same structure 128. For example, each structure 128 can include a dynamic HF antenna system that can evaluate transmission parameters (e.g., frequency, antenna length, and/or antenna orientation) in real time for determining ideal transmission parameters. The ideal transmissions parameters are shared by the dynamic HF antenna system to the static HF antenna systems on the same structure, optionally through a central controller. This process is continuous, such that as conditions changes, the dynamic HF antenna system determines new transmission parameters in real time for sharing with the nearby static HF antenna systems.

In these and other embodiments, an ABCU 12 (for example the ABCU belonging to the dynamic HF antenna system) can determine ideal transmission parameters using a neural network. More particularly, the ABCU 12 can receive a radio frequency signal via the antenna 14, convert the radio frequency signal into a digital signal using an analog-to-digital converter, and process, by a neural network, the digital signal to produce an output that is indicative of an optimal frequency for radio communications. In some embodiments, the neural network includes a layered structure of artificial neurons that adjust internal parameters to minimize the difference between a predicted output and a measured output, for example, a predicted radio signal strength as compared to a measured radio signal strength. The internal parameters can be adjusted over many iterations until the neural network produces accurate outputs for a wide range of inputs, including for example solar data, weather data, and/or ionospheric conditions.

Figure 11:
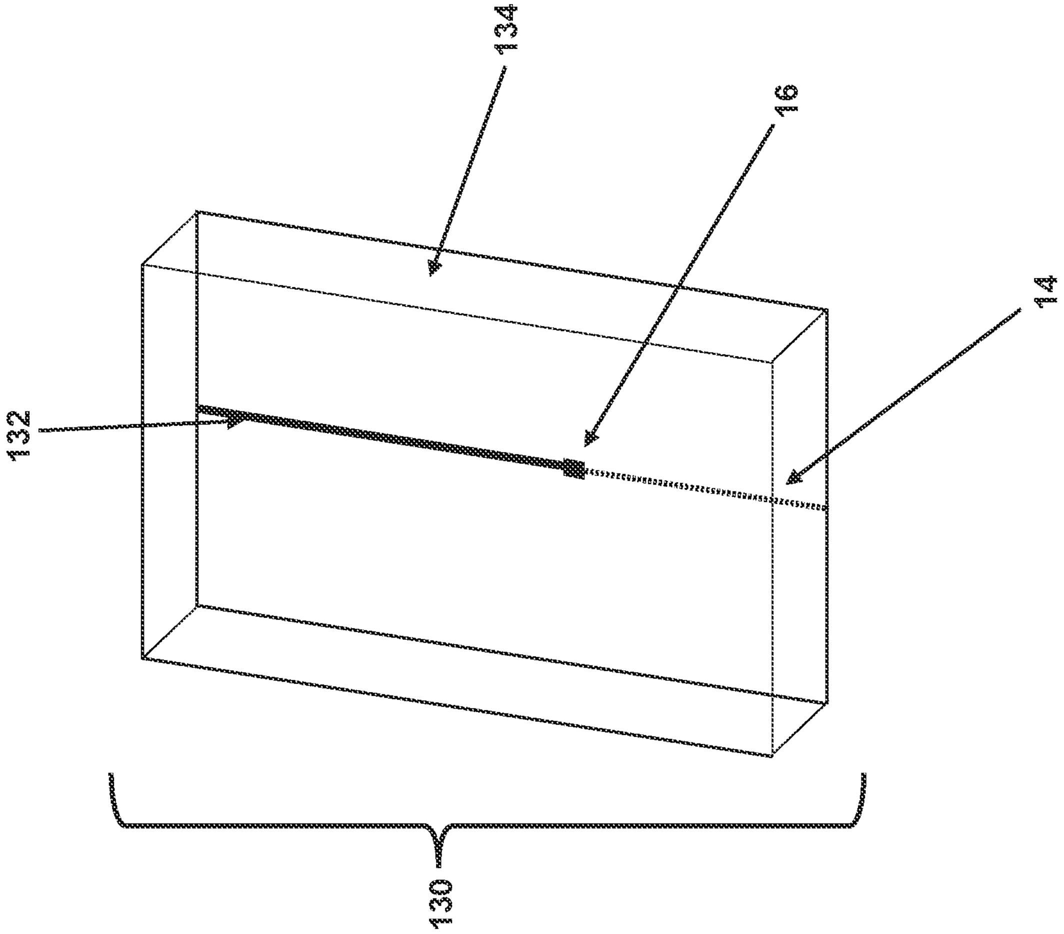
FIG. 11 is a depiction of a weatherproof casing for a non-insulated antenna wire having an antenna positioning unit deployed on a vertical track.

As illustrated in FIG. 11, the antenna wire 14 can be contained within a weatherproof casing 130. As in the above embodiments, the terminal end of the antenna wire 14 is coupled to an APU 16. However, the APU 16 of FIG. 11 is deployed on an upright track 132, rather than comprising an aerial platform such as a drone. The weatherproof casing 130 is optionally six-sided and includes a reflective backing 134 along a major surface thereof, such that the antenna 14 is semi-directional. In other embodiments, the weatherproof casing 130 is cylindrical or can be configured differently as desired. In still other embodiments, the ABCU 12 can be integrated into the HF radio 10, such that the ABCU 12 is not a separate unit. The antenna wire 14 is described above as being a slack wire, however in other embodiments the antenna wire 14 can be a collapsible telescoping antenna used in connection with the ABCU, such that the APU is not required. As drones become lighter with greater payload capacity, the ABCU can be completely integrated into the APU. For multi-drone embodiments, the drones can communicate to the ABCU or each other via short-range communications, and the aloft drones can extend the antenna wires between them for transmitting and receiving HF radio communications.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular.

The invention claimed is:

1. A high frequency (HF) radio communications antenna system, the system comprising:
- an HF radio;
- an antenna base and control unit;
- an antenna wire; and
- an antenna positioning unit;
- wherein the antenna base and control unit is connected to the antenna positioning unit by the antenna wire and is connected to the HF radio, the antenna base and control unit being configured to calculate an antenna length and an antenna orientation for HF communications based on environmental data from the HF radio;
- wherein the antenna wire is retractable within the antenna base and control unit, such that an unwound portion of the antenna wire that extends between the antenna base and control unit and the antenna positioning unit defines the antenna length for HF communications;
- wherein a location of a terminal end of the antenna wire is adjustable via positioning of the antenna positioning unit for varying the antenna orientation for HF communications;
- wherein the antenna positioning unit is an airborne device that is configured to position the terminal end of the antenna wire at a distance relative to the antenna base and control unit;
- wherein the antenna wire includes:
  - a radio wire and a power and control cable; and
  - a plurality of cross-bolt interface connections for adjusting the effective length of the antenna wire,
  - wherein each of the plurality of cross-bolt interface connections includes an upper section, a lower section, and an opening therebetween,
  - wherein a retractable cross-bolt separates the upper section of the cross-bolt interface connection from the lower section of the cross-bolt interface connection, and
  - wherein the upper section of the cross-bolt interface connection includes an antenna wire connection that is coupled to the radio wire and includes a control cable connection that is coupled to the control cable, such that the retractable cross-bolt couples the radio wire and the control cable to an HF radio within the antenna base and control unit.

2. The system of claim 1, wherein the antenna positioning unit is a drone.

3. The system of claim 1, wherein the antenna positioning unit includes a steerable balloon.

4. The system of claim 1, wherein the antenna positioning unit is a fixed-wing unmanned aerial device.

5. The system of claim 1, wherein the antenna base and control unit is located on or inside of a vehicle.

6. The system of claim 5, wherein the vehicle is an aircraft and the antenna positioning unit is a device towed by the aircraft.

7. The system of claim 5, wherein the vehicle is a watercraft.

8. The system of claim 1, wherein the antenna base and control unit is located on or inside of a structure.

9. The system of claim 1, wherein the antenna base and control unit is located on or inside of a permanent structure, a temporary structure, a building, or a tent.

10. The system of claim 1, wherein the antenna base and control unit includes a radio antenna port connection, a data port, an internal CPU, an antenna wire spool, an antenna wire guide, and an internal connection from the antenna wire spool to the radio antenna port.

11. The system of claim 1, wherein the antenna base and control unit includes a user interface comprising an information display.

12. The system of claim 1, wherein the antenna base and control unit comprises an internal CPU, and wherein the internal CPU further comprises a GPS receiver.

13. A method of positioning an antenna wire of the system of claim 1 to transmit or receive data from a radio station, the method comprising the steps of:

calculating an antenna length and an antenna orientation based on the environmental data from the HF radio;

positioning the antenna positioning unit such that the antenna wire includes the calculated antenna length and antenna orientation; and receiving and/or transmitting data via a radio connection established between the system and the radio station.

14. The method of claim 13, wherein the antenna positioning unit is a drone.

15. The method of claim 13, further comprises repeating the steps of calculating an antenna length and an antenna position for at least one other radio station.

16. The method of claim 13, further comprising the step of moving the antenna positioning unit to the antenna base and control system and deactivating the antenna positioning unit.

17. The method of claim 13, wherein the time of day data, positional data, frequency data, and the environmental data is received from an external source.

18. A method of processing a radio frequency signal using the system of claim 1, the method comprising the steps of:

receiving an analog radio frequency signal at the antenna wire;

converting, using an analog to digital converter, the analog frequency signal into a digital frequency signal; and processing, by a neural network, the digital signal to produce an output that is indicative of an optimal frequency for radio communications with a remote radio station based on at least one of solar data, weather data, and ionospheric data.

19. The method of claim 18, further including the step of:

causing the system of claim 1 to communicate the optimal frequency to at least one co-located antenna system for establishing a radio link with the remote radio station.

* * * * *